United States Patent Office 3,114,936
Patented Dec. 24, 1963

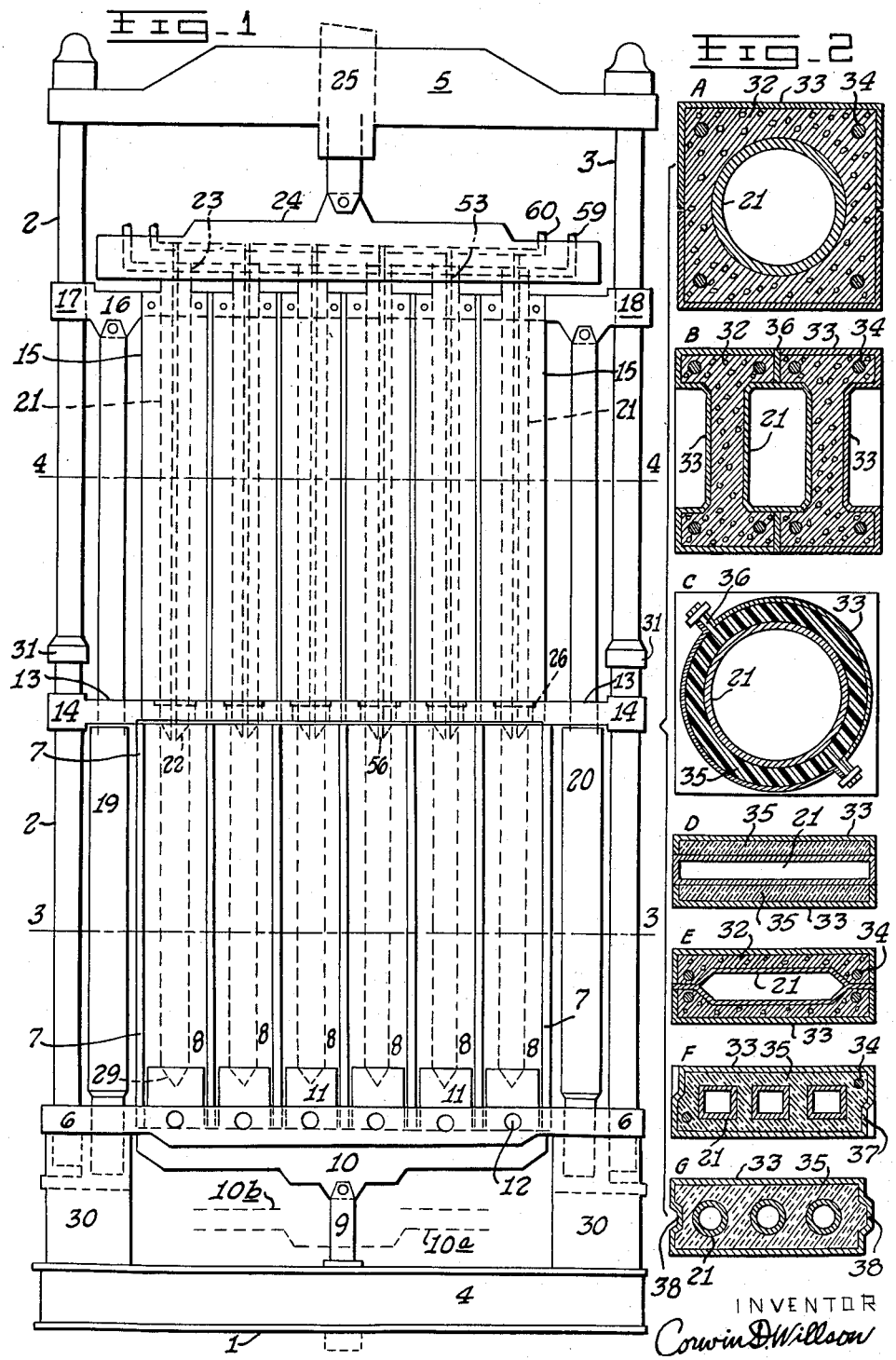

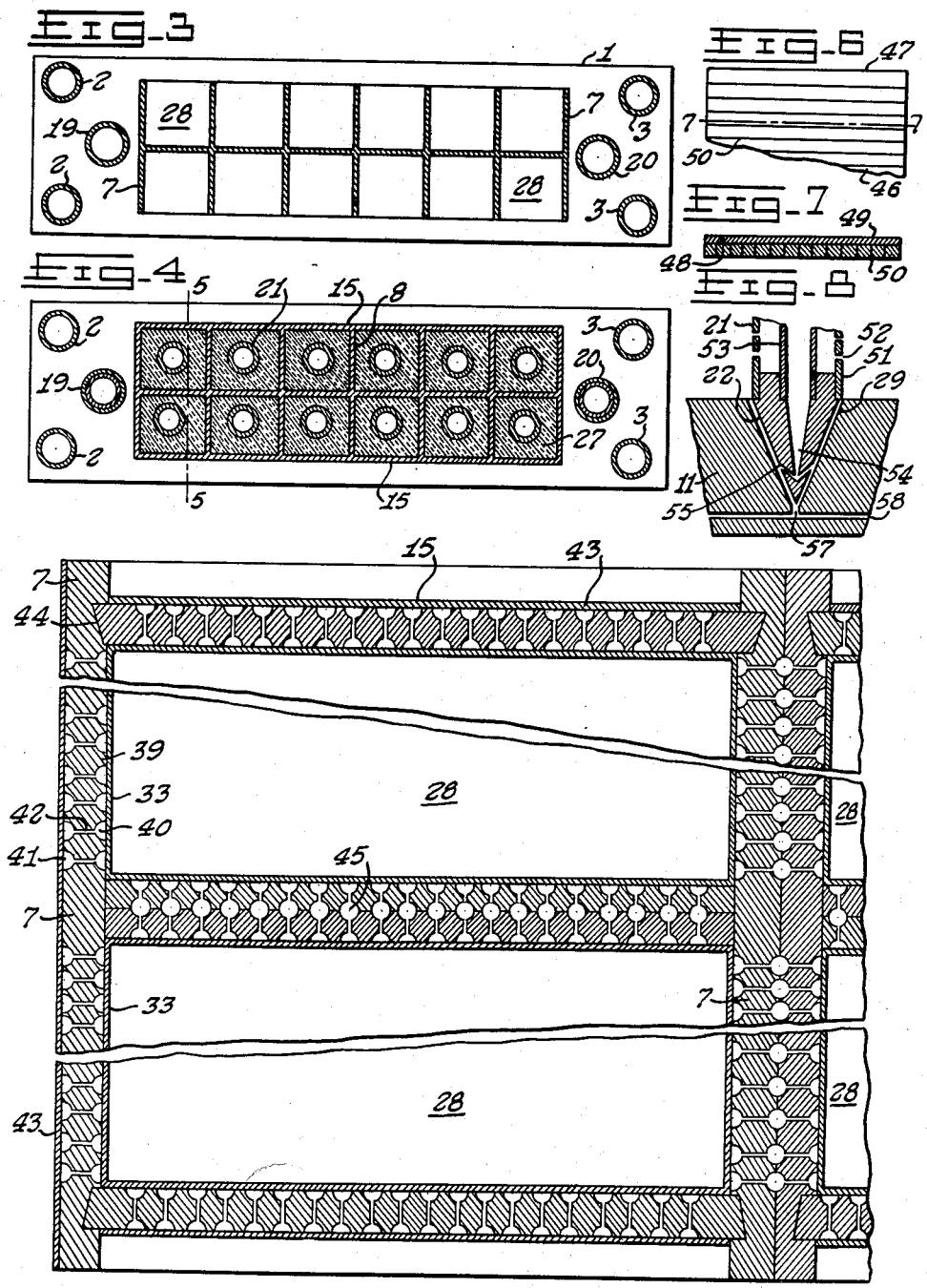

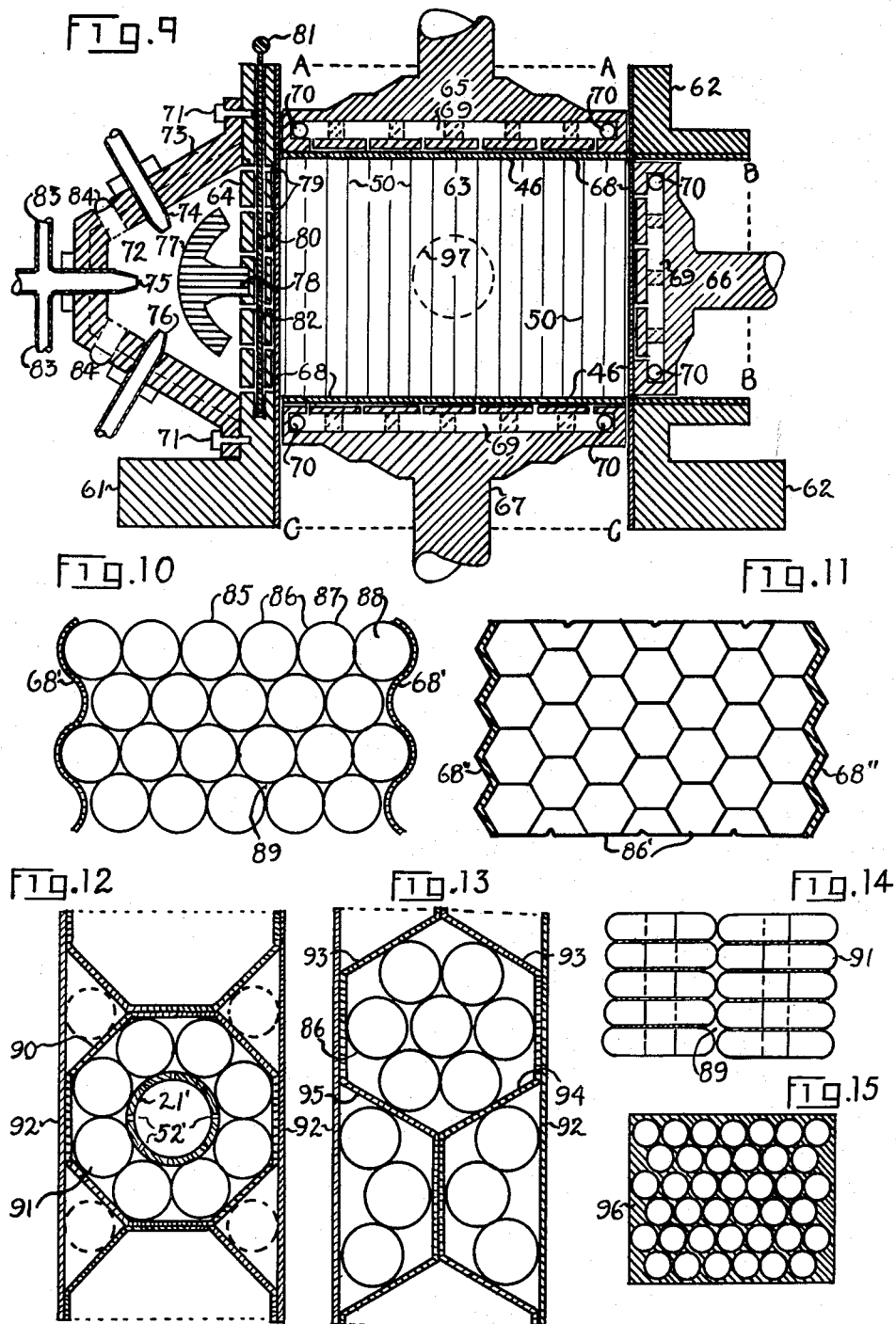

3,114,936
THERMO-MOLDING APPARATUS AND A PROCESS OF UNITING MASSED HOLLOW BODIES
Corwin D. Willson, 525 Golden Gate, Lake Orion, Mich.
Filed Nov. 23, 1959, Ser. No. 854,799
19 Claims. (Cl. 18—38)

This invention relates to apparatus and a product-forming process which subjects a mass of confined discrete material to application of pressured hot or cold fluent matter to consolidate and shape the mass. This application is a continuation in part of my co-pending application Ser. No. 413,383 filed March 1, 1954, now Patent No. 3,002,248, herein called "the parent application," which was a continuation of Ser. No. 681,400 filed July 3, 1946 and maturing as Pat. No. 2,674,775, herein called "the parent patent." Some of the drawings herein relate directly to FIGS. 23 and 24 of my co-pending application Ser. No. 802,885 filed March 30, 1959 and now abandoned.

The parent patent claimed use of a gas in forming a panel having a foamaceous core between dense opposite facing sheets, the panel made up of aqueous mixtures of porous aggregate materials and cementitious binders, particularly a cold-setting binder, such as Portland cement. The parent application claimed use of a gas in forming solid and hollow structural units, particularly a hot gas acting on thermo-binding ingredients. The primary object of this invention is a process fundamentally that of the parent processes but involving apparatus modified to the requirements of products formed of ceramics, powdered metals or glass.

Another object of the invention is a process of forming structural components and members that combine substantial strength with minimal weight. To understand how Nature achieves strength with minimal weight, we study the feather, the egg-shell, the bamboo or straw stem. Prior art teaches the attempts to achieve light weight in molded structures by means of voids: either chance voids such as those of foams (see my "House of Foam," Pat. No. 2,548,576), or ordered voids formed by retractible core members. Foams tend to be weak and of variable density while voids formed by removable cores tend to be heavy and commonly useful for resisting compression stresses, as in load-bearing walls. To meet the need for a featherweight material that is resistant to substantial three-dimensional stresses, the invention proposes to form such a material by fusing masses of preformed hollow bodies.

As used herein, a hollow body will be understood to mean a hollow shell wholly enclosing a void that makes up 75 percent or more of the total bulk of the body. This shell may have the outward form of a Christmas tree glass bubble, or the form and structure of a gelatin capsule, or the form and structure of a ping-pong ball. Such a shell may be formed of plastics, glass or metal and the void may be filled with a gas lighter than air, such as helium, and sealed in. The size of such hollow bodies can vary widely, but if this size is set as something between one-quarter inch and three inches in diameter, these dimensions will serve to pin-point the general character of the term "hollow body" as used herein. By confining a mass of such hollow bodies loosely in a mold and applying a very hot gas interiorly of the mass and in contact with each separate hollow body, the bodies are fused together to form a novel structural material that is strong in all three dimensions, yet having less weight than any strong pre-space age product now available—a material made up in preponderant part of ordered voids, each walled on all sides.

Another object of the invention is a process of forming a dense highly heat-resistant product by slightly fusing together and shaping a confined mass of discrete particles in a mold, and completing the fusion of the particles outside the mold.

Another object of the invention is a process of making a translucent panel from a confined mass of bubble-like bodies each having an outside consisting of a transparent film of thermo-plastic material.

Another object of the invention is a process of forming a product that shields against solar and cosmic radiation.

Another object of the invention is a mold wherein highly fusible temperatures are generated or utilized in contact with a confined mass of siliceous particles.

Another object of the invention is a mold wherein a confined mass of turbulent particles may be subjected to a very hot gas before consolidation by substantial mechanical pressure in the mold.

Another object of the invention is a mold wherein a confined mass of moldable material may be subjected to plus and minus pressures and to heat and cold.

These and other objects of the invention will become apparent as the description proceeds. By this process and the apparatus to be described herein, products are formed that range from the ultra-dense to the feather-light. These and other novel features and objects of the invention are hereinafter more fully described and claimed; and the preferred forms of my process and some of the products shaped thereby are shown in the accompanying drawings, in which:

FIG. 1 is a side view, partly in section, of a molding apparatus set up to mold some of the products described herein.

FIG. 2, in drawings A to G, shows cross sections of a variety of products formed according to the invention.

FIG. 3 is a section taken on line 3—3 of FIG. 1.

FIG. 4 is a section taken on line 4—4 of FIG. 1.

FIG. 5 is an enlargement of that part of FIG. 4 which is adjacent to line 5—5.

FIG. 6 is a side view of a portion of the bleeding mold liner shown in FIG. 5.

FIG. 7 is a section taken on line 7—7 of FIG. 6.

FIG. 8 is a vertical section of the ramming point on one of the conduit core members shown in FIG. 1.

FIG. 9 is an alternate type of mold for applying fluent matter to a confined mass of material under a wider range of pressures and temperatures than those described as being utilized by the apparatus of FIG. 1.

FIG. 10 is a cross section of a mass of globular hollow bodies united according to the invention.

FIG. 11 is the mass of FIG. 10 after the process has turned the globular hollow bodies to polyhedrons.

FIG. 12 is a structural member made up of united masses of hollow bodies according to the invention, as well as of octagonal tubes and sheets.

FIG. 13 is another structural member made up of two flat sheets, two deformed sheets and united masses of hollow bodies.

FIG. 14 is a ray-shield made up of massed hollow bodies having capsule form and filled with shielding material.

FIG. 15 is a section on line 15—15 of FIG. 14.

Accessory equipment for handling the ingredients of the mold charges prior to confining them in the mold, for making steam, compressing air, creating a vacuum, refrigerating fluent matter, storing the described gasses, mixing the gasses, for operating the hydraulic cylinders, valves, control boards, gauges, wiring, pipes, push buttons, conveyors for removal of the molded product, and all other essential appurtenances are not shown since the procedures relating thereto may be considered adaptations of practices old in the art.

In the drawings, multi-molder or press 1 has an outer framework comprising pairs of opposite columns 2 and 3 supporting between base 4 and top-member 5 a fixed press bed 6 which support walls 7 of a gang-mold consisting of six back-to-back pairs of molds 8 shown open faced in FIG. 1 but closed before receiving their charges. Actuated by hydraulic cylinder 9, lower travel beam 10 supports pistons 11 which pass upwardly through bed 6 to fit slidingly into bottom ends of molds 8. When beam 10 is lowered to bottom position 10a, ports 12 housed in bed 6 are opened and mixture or charge to be molded may be injected through open ports into each mold 8. Raising beam 10 to the intermediate position 10b, after molds 8 are fully charged, closes ports 12 and the charges are fully confined. The upper ends of gangmold walls 7 fit up into the bottom of closure 13 which has outer guides 14 mounted to slide on columns 2 and 3. Closure 13 is called top closure to differentiate it from side closures 15 for each of the open-faced molds 8. Upper ends of closures 15 are fixed to intermediate travel beam 16 having guides 17 and 18 slidingly mounted on side columns 2 and 3 to permit beam 16 to be raised and lowered by hydraulic cylinders 19 and 20. When intermediate beam 16 is fully lowered, closures 15 at their lower ends fit into grooves in bed 6 and wholly close the open outer faces of molds 8. Passing through both top closure 13 and intermdiate beam 16 are ramming conduits or core members 21 having lower ends comprising taper tips 22 and having upper ends 23 fixed into top travel beam 24 actuated by cylinder 25. Ramming conduits 21 are exteriorly rigid, of constant volume and above the taper of tips 22 have outer shells of constant cross section to have a snug sliding fit in sealing bushings 26 housed by top closures 13.

The molding cycle is as follows: Beginning with empty molds and lower travel beam 10 in the 10b position, intermediate travel beam 16 is lowered to close all molds 8 with closures 15. The interior molding space of each mold 8 is then fully closed on all sides and top closure 13 and intermediate beam 16 are closely nested. Next, travel beam 10 is lowered to the 10a position which opens ports 12. The charge of discrete material is then injected, as by being pumped or blown through open ports 12 into molds 8. If the charge is a mixture of fluid and solid ingredients, as in concrete, the plastic mass contains an excess of mixwater and molds 8 are filled with the mixture. Travel beam 10 is then returned to the 10b position to close ports 12 with sliding pistons 11. The entered and confined charge in each mold 8 is now subjected to mechanical pressure by lowering beam 24 which forces ramming conduit 21 downwardly into the confined interior of charge 27 filling each mold cavity 28, taper tip 22 cutting down and further down through the plastic constituents of the charge until tip 22 enters receiving socket 29 in the top of each piston 11. Meantime, mechanical pressure exerted directly on the interior of the confined charge 27 in each mold 8 by the downward travel of ramming conduit 21 therein displaces excess mixwater through porous walls 7 (hereinafter more fully described) and from cavities 28 and simultaneously forces the solid and cementitious constituents of the concrete toward the mold walls to consolidate and shape the constituents. Should further compaction be necessary, lower beam 10 and top beam 24 are now raised together until lower beam 10 occupies the position, near its upward limits, shown in FIG. 1. This further reduces the inside volume of cavity 28 while ramming conduit or core member 21 still is therein. Top beam 24 is then raised to a position even higher than shown in FIG. 1 and intermediate beam 16 is raised to lift side closures 15 to thus open outer side faces of molds 8 and hydraulic cylinders 30 are actuated to raise top closures 13 to limits allowed by stops 31. By this time, the entire outer side and top portions of molds 8 are open and the molded products may be removed therefrom. This may be by means of an overhead conveyor (not shown) laying hooks into coactive parts of the mold liners (hereinafter described) and drawing the molded products, protected by their mold-liners, from cavities 28 and conveying them to a curing and storage space outside the limits of the process here being described. The molding of charges other than plastic concrete will be hereinafter described. But the steps of the process thus far described will be more clearly understood if typical sections of the kinds of products intended to be formed are first described.

In FIG. 2(A) is a structural member, useful as a post, lintel or floor panel, and consisting of a rectangular mass molded as described from hardenable plastic material 32 confined between porous mold liner 33 and ramming conduit or core member 21. Where composition 32 is concrete, it may be reinforced by metallic rods 34. Mold liner 33 in two portions is only stripped from the molded product when the latter is sufficiently hard-set to permit removal of the liner. In case the binder is Portland cement, this might be from ten to thirty-six hours except for procedures hereinafter described. FIG. 2(B) shows a pair of identical I-beams, the material 32 being concrete reinforced by rods 34 and compacted between liner 33 and core member 21 as described. FIG. 2(C) is a column, post, tube, pipe or conduit. While no metal reinforcement is shown, such a product lends itself to being reinforced with my "prestressed unit" described in my co-pending application Ser. No. 604,398, filed August 16, 1956, and now abandoned, as carrying nibs which hold the prestressed unit in exact spacial relation relative both to the liner 33 and core member 21 and also serves to guide core-member 21 in its travel within mold cavity 28. In this instance, the 2(C) product is molded from a charge of fibrous aggregate particles compacted in mass 35 between mold liner 33 and core member 21. Where it is desired to mold semi-circular troughs or irrigation flumes, mold members such as spacers 36 between the I-beams of FIG. 2(B), may be inserted in the mold cavity 28 between two segments of liner 33. FIG. 2(D) shows two solid slabs molded of mass 35 between liners 33 and ramming conduit 21, which in this instance extends from wall to opposite wall of mold 8 between the two slabs. FIG. 2(E) shows two metal-reinforced channel beams as of standard or lightweight concrete 32 molded between mold liner 33 and conduit 21. Troughs, conduits and irrigation flumes of closed rectangular or open-sided rectangular cross sections may be formed in this same manner. FIG. 2(F) shows a wall-thick hollow panel having mass 35 and ship-lap edges 37 molded between liner 33 and core members 21, each of the three core members 21 being square in cross section. FIG. 2(G) shows panel of mass 35 having tongue and groove edges 38 formed between mold liner 33 and three round ramming conduits 21. These various sections represents only a few of the variety of products, solid or hollow in cross section, that may be molded in multimolder 1. T beams, corrugated slabs, containers, products structural or ornamental, dense or insulative and foamaceous may be formed as described from a wide choice of raw ingredients. Where a void as made by member 21 is not desired within the molded product, the conduit member 21, as in FIGS. 2(B), 2(D) and 2(E), may be employed outside the molded product to form a void between two solid products in the same mold.

FIG. 3 shows multimolder 1 without side closures 15 for each mold cavity 28 in place. FIG. 4 shows the side closures 15 locked in place and ramming conduits 21 before retraction from molds 8. In FIG. 5, walls 7 house rigid burnished-faced mold liners 33 of filtering structure hereinafter described. Inner faces 39 of walls 7 have spaced upright grooves 40 and, aligned with these, grooves 41 connected by tiny fluid passages 42 with grooves 40 whereby fluent matter, liquid or gaseous, forced through liners 33 may escape from mold cavities 28. Impervious outer facing 43 keeps displaced fluent matter in grooves 41 which are outwardly vented to carry the displaced fluent matter out of molds 8 for possible reuse in subsequent mixes to conserve binder and other valuable fluent matter bled from the cavities 28. Closures 15 have outer edges held in a tight sliding fit by grooves 44 and closures 15 may be outwardly stiffened by structural bars (not shown) to resist high internal mold pressures without distortion. Where walls 7 are back-to-back, grooves 41 of contiguous walls are aligned to form passages 45. Passages 40, 41, 42 and 45 may collectively be considered a conduit system similar to void 24 in FIG. 8 of the parent patent for receiving fluent matter filtered from the confined charges 27 being molded. Obviously the flow of such fluent matter can be pressured from outside the mold to be in the opposite direction from that which is being described and, as will be described hereinafter, the pressured flow of fluent matter into mold cavities 28 through porous walls 7 can be utilized to consolidate confined charges 27.

Heretofore mold liners of filtering type have usually been built up by the use of metal screen, burlap or canvas superimposed on perforated mold walls. Such filters impose a pattern of woven wire or fabric on the surface of the product being molded like that on the back of a piece of Masonite. To achieve a smooth surface in products molded in multimolder 1, the mold liner 33 is shown in FIGS. 6 and 7 to be a filter plate 46, made of two layers of rigid metal strips or bars 47, in each layer fixed snugly edge-to-edge together so that a few thousandths or ten-thousandths of an inch separates them, the strips 47 on one side of plate 46 running crosswise of the strips on the opposite side of plate 46 and the strips being fixed together by demountable fasteners 48. The molding surface 49 of such a filter-plate may have a mirror polish, yet a gas or liquid under pressure will pass through cracks 50 leaving solids behind. In molding two pairs of the slabs of FIG. 2(D) in a single mold, a filtering spacer (not shown) between the two pairs may be made by simply spacing two filter-plates 46 with spaced vertical strips. One virtue filter-plate 46 has that perforated metal or wire screening lacks is the ability of filterplate 46 to conduct liquid or gas in several directions so that the plate is not easily clogged. Intersecting cracks are cleaned by being "blown" with liquid or gas under high pressure and from time to time, the strips are disassembled, the edges thoroughly cleaned and the strips reassembled. Metal screen, burlap and canvas are particularly ill-suited for forming products as hereinafter described with thermo-binders.

FIG. 8 shows ramming conduit 21 to comprise a tubular outer housing 51 having perforations 52 and at the lower end having a taper tip 22 into which is fixed a small-diameter pipe 53 which extends centrally of tube 51 and connects with tip passages 54 having tiny egress orifices 55 spaced around the outside of tip 22, not far from the apex. In FIG. 1, pipe 53 runs to a single egress orifice 56 in the very end of tip 22. In pistons 11, receiving sockets 29 have orifices 57 connected by inner passages 58 with a source of compressed air which is used to drive charge ingredients from sockets 29 before entrance of tips thereinto. As ramming conduits 21 are thrust progressively downward into the confined mix or charge 27, this thrust is eased by jets of gas, such as compressed air, issuing from orifices 55 or 56, one type directing a jet dead ahead of the advancing tip like a garden hose burying itself in the ground, the other type directing smaller jets backward from the advancing tip, the taper of which directs the jets outwardly from the advancing housing 51. Some types of mixtures will require both types or orifices in the same tip. Top ends of tubes 51 are connected by passages 59 with a source of fluent matter under pressure. Top ends of pipes 53 are connected by passage 60 with another source of fluent matter under pressure, fluent matter which may be extremely hot or very cold. Passages 59 and 60 may convey quite different kinds of fluent matter according to the product being formed and the nature of the ingredients and/or binders used.

In general, it may be said that the apparatus described is intended for use in giving lasting form to products from charges of discrete material. As used herein "discrete material" will mean material made up of distinct parts, separate bits, loose particles, such as the aggregate material—sand, gravel, Portland cement—used in making concrete. An uncompacted mass of such material is highly porous so that fluent matter under pressure may easily be passed through it. "Fluent matter" as used herein is fluid: it flows, which means that it may be a liquid, gas, a salt in solution, or finely divided solid matter dispersed in a gas or liquid. "Conduit" as used herein is a conductor of fluent matter. The charge confined in the mold cavity may be wet or dry; it may be a mixture of mineral or vegetable components; individual particles may be fibrous, porous or solid; the charge may itself be agglutinous and cementitious or have binders added. These binders may be cold-setting, such as Portland cement, lime, gypsum, magnesite. A cold-setting cement may have a heat-sensitive additive which may consist only of an aqueous solution of polyvinyl alcohol or casein or sodium silicate, or an emulsion of asphalt, or latex. Or the binders may themselves be resinous, pitchy, fusible, thermoplastic or thermosetting: herein, for brevity grouped together as "thermo-binders." "Treating fluent matter to changes of pressure and temperature" will mean herein changes relative to the existing atmospheric pressure at a given time and place and relative to room temperature. Some types of fluent matter will require only sufficient pressure to convey it into the mold. Temperature of the fluent matter injected into the mold has to be adapted to the character of the charge ingredients. As is well known, unset plastic Portland cement is injured by heat exceeding 200 degrees F. But the molding process herein described can use steam exceeding 200 degrees F. because of the large excess of mixwater in the charge initially which reduces the steam temperature before it can damage the concrete. This steam is passed through tube 51 and by way of perforations 52 into the confined mix to hasten the lime-silica reaction. With the air mixed with the steam may be mixed a small percentage of an oxide of carbon, such as carbon di-oxide, to hasten the change of some of the free lime in the mix to lime carbonate. A few minutes of pressure-steaming of the molded product from the inside out at temperatures below 200 degrees F. and with the live steam in direct contact with the uncemeted particles of the confined mix has as much effect as an hour's "curing" exposure to saturated steam outside the mold under atmospheric pressure according to common practice. The term "apply" as used herein in the applying of a gas, and particularly a hot gas interiorly of a confined charge to consolidate and shape the charge, goes gack to the original meaning of "apply" which has "to bring into close contact with." As the art shows, the parent Patent No. 2,674,775 was the first molding process to "apply" a hot gas interiorly of a mold-confined charge by bringing steam into direct contact with heat-sensitive discrete material in the mold. It is that unclaimed aspect of the parent patent which is being carried here into modifications which will presently appear.

In molding concrete by the process here being described, the amount of excess mixwater in the charge is determined largely as follows: The amount of excess mixwater displaced from each molded unit is roughly equal to the sum of (a) the volume of ram housing 51, (b) the volume lost to the mold cavity by up-movement of piston 11 therein, (c) the amount of water still left in the molded product and subsequently lost by evaporation outside the mold, (d) the amount of water going into chemical combination with other ingredients of the charge. The sum of these amounts will give a volume of mixwater substantially greater than the minimum required to make the charge merely plastic and anything over that minimum, for purposes of identification, will be called herein "excess." A charge containing this excess will be called "a slurry" or a "too-plastic" charge or a "high-slump" concrete as the case may be, this excess of liquid making the charges sufficiently fluid to be passed through pumps and pipes on the way to ports 12.

Although the apparatus thus far described is adapted to forming by automation and push-button a wide range of products from moldable mixtures of fluid and solid materials, utilizing the mechanical action of ramming conduit 21 to reduce the volume of each mold cavity 28 and thus of charge 27 confined therein, it is not necessary that the ramming conduit travel the entire length of the mold cavity. As seen in FIG. 9 of the parent patent, conduit 31 therein releases a gas through apertures 32 interiorly of the confined charge without any movement of the conduit. Thus, in multimolder 1 herein, conduit 21 may extend the entire length of mold cavity 28 or any fraction of that length, and the moldable charge may be entered into the closed mold around conduit 21, perforations 52 and orifices 55 scattered around the sides of tube or casing 51 from end to end thereof releasing fluent matter into the confined charge 27. This fluent matter is subjected in accessories outside the mold to changes of temperature and pressure and is released in jets directed outwardly toward and, in part or in whole, through filtering plates 46 to consolidate and shape the mass while conduit 21 is stock still. Under these conditions, where charge 27 contains or comprises thermo-sensitive or thermo-binding material, one or more of the kinds of fluent matter so released will be hot to activate the thermo-sensitive or thermo-binding material; and if the binder is thermo-plastic, then after the release of the very hot fluent matter interiorly of the confined charge, very cold fluent matter is released interiorly of the charge to stiffen and harden the heat-softened thermo-binding material. The jetting of fluent matter in all directions away from conduit 21 frees it for subsequent easy retraction from the mold cavity 28, where in prior practice there were only two ways of easy withdrawal of a core member from a molded void: (a) giving the core member a substantial lengthwise taper; (b) making the core member collapsible. Whether conduit 21 is operatively mounted as in FIG. 1 for in and out movement relative to the confined charge or is temporarily fixed in the mold as in FIG. 9 of the parent patent, the manner of freeing core member 21 from the molded charge is novel in the art.

FIG. 9 shows an alternate type of mold used by the process being described: mold 61 having housing 62 wherein mold cavity 63 is enclosed by a fixed wall 64, other walls constituting pistons 65, 66 and 67. Molding surfaces 68 directly exposed to cavity 63 are of the filter-plate 46 type shown in FIGS. 6 and 7 to have cracks 50 as little as a few ten-thousandths of an inch wide: and backed by rigid conduits 69 which lead to outer connectors 70 whereto flexible conduits (not shown) may be attached leading to accessories such as vacuum pump, compressor, storage tanks and the like for preparing a hot or cold gas under plus or minus pressure. Top piston 65 may be raised above the top limits A—A for admission of a moldable charge, then lowered to confine the entered charge. Side piston 66 may be drawn out to outer side limits B—B and bottom piston may be dropped to lower limits C—C. With the inner faces 68 of pistons 65, 66 and 67 at limits A—A, B—B and C—C respectively, mold cavity 63 has an enlarged volume greatly exceeding that of the confined charge. Consequently, a gas under pressure entered by way of connector 70 into conduit 69 will pass through cracks 50 in filtering surfaces 68 into the confined charge and throw the particles into a state of turbulence, particularly if filtering surfaces 68 of side piston 66 and top piston 65 are bleeding or sucking out of the mold cavity 63 through connectors 70 the gas causing the turbulence. Against fixed wall 64 is secured by bolts 71 a chamber 72 having the general shape of a truncated cone or pyramid, the ceramics-lined or heat-resistant walls 73 housing a number of nozzles 74, 75, 76 all directed toward a convex, toadstool-shaped diffusion member 77 having a stem 78 secured to wall 64 and holding member 77 spaced from wall 64 wherein apertures 79 provide means of fluid passage between chamber 72 and mold cavity 63. Wall 64 houses a retractible shutter 80 having protruding handle 81 whereby shutter 80 may be withdrawn from slot 82. In FIG. 9, shutter 80 is shown in slot 82 closing communication through apertures 79 between chamber 72 and mold cavity 63. The purpose of chamber 72 is to receive from accessories wholly outside the mold, and not shown because old in the art, gases of moderate or extremely high temperatures; or to house the means of preparing such gases directly inside chamber 72 by the combustion of one or a combination of combustibles passed through nozzles 74, 75, 76. Details of the interior structure of these nozzles are not given. But the nozzles may be connected as by pipes 83 with such compressed gases as oxygen, hydrogen, acetylene, and one or more of the nozzles may be connected with a source of fuel oil, natural gas or other heat-producing material. Exterior air may be admitted through walls 73 into chamber 72 by way of opened closures or valves 84. With shutter 80 withdrawn and apertures 79 open, with one or more of nozzles 74, 75, 76 directing a flame against diffusion member 77, and with suction applied to connectors 70 in top and side pistons 65, 66, highly hot gases may be applied interiorly of a charge of discrete material confined in mold cavity 63. At the same time pressure applied to connectors 70 of bottom piston 67 may throw the confined charge into turbulence so that each separate particle may be heated by the flow of hot gas into, through and from the mold cavity 63. Pistons 65, 66, 67 can then be moved, as by the hydraulic cylinders shown in FIG. 1, inwardly to greatly reduce the volume of the cavity, thereby compacting and consolidating the heated particles of the charge into a single shaped mass. By this means, the scope of the parent application is substantially broadened to encompass objectives not contemplated by the parent specifications.

For example, consider ceramics. Prior art teaches the formation of a clay product: a slip being first prepared and poured into a mold whereupon all the water must be got rid of before the formed product can go into a kiln. By means of mold 61, no slip need be prepared. The clay is mined, ground and bolted and a charge of the dry clay powder is confined in cavity 63, subjected to a state of turbulence and to the direct application of high-temperature steam through connectors 70 (while shutter 80 closes apertures 79) and pistons 65, 66 and 67 move inwardly to compress and form the product. The steam contains only sufficient moisture to stick the clay particles together. A minimum of drying outside the mold (or in the mold) is necessary. Shrinkage is held to a minimum. Such a molded product is forcibly ejected from mold 61 by simultaneous downward movements of pistons 65 and 67 below the lower limits C—C, and the ejected product can go onto a moving belt that takes it relatively quickly through a drying oven into a kiln.

Alternately, a charge of dry clay powder (or any powdery, flaky, scaly type of discrete material) plus a minimal amount of heat-sensitive binder diffused therein, is confined in cavity 63 and a hot gas produced directly in chamber 72 is applied to the particles while in a state of turbulence to make the binder cementitious and the pistons 65, 66, 67 apply the pressure required to consolidate and shape the charge, whereupon, if the powder is clay, the formed product goes immediately into the kiln without any need of drying. With the high temperature resistant materials being developed by rocket programs, the top limits of the heat or gas produced in chamber 72 is above the melting points of many metals and/or fluxing materials which the invention may utilize as binders. This any kind of hollow bodies for use as a structural group. Such hollow bodies, like a capsule, may be filled with fluids or solids under plus or minus pressures according to the ends in mind.

For example, a ray-shield for radioactive power-plants in air transport is built up according to the invention in various ways, such as by uniting a mass of hollow bodies having outer shells 87 and interiors 88. Shells 87 may enclose a gas, liquid or solid. Shells 87 may be formed of elements of high atomic weight, or a film-forming plastic or glass containing components of high atomic weight. Such a rayshield may have passages 89 for the circulation of a coolant such as air or, if in a submarine, water; or the shells 87 may be compressed to lack such spaces as in FIG. 11; or the spaces 89 may be filled with a solid substance 96. Such ray-shields may easily be given a most complex, even layered, internal structure and shaped to take any form.

Another example is a structure built up of quite large "bubbles" filled with a lighter-than-air gas, the material stiffened by the polyhedral form of the hollow-bodies of FIG. 11. Where such "bubbles" have the size of toy balloons, it is conceivable that the structure which results actually defies gravitational attraction and will float up into the air of itself. This suggests that rockets may not be the only means of launching a "space platform." In fact, with the structure just described, a fairly large and lasting "platform" might be launched by balloons and other aids. This example is cited for its mentally catalytic significance as demonstrating the dynamic character of the invention and what may flow from it.

From this description, it is seen that both the apparatus and the manner of its use are essential to attain the objects of the invention and to make possible a new process like but modifying and extending the bounds of the parent inventions. It is apparent that much which has been described as related to mold 61 may be made part of multimolder 1 and that much relating to multimolder 1 may be made part of, or include mold 61, particularly ramming conduit and core-forming member 21 which, in FIG. 12 is shown as a void-forming conduit 21'; also that many materials including hollow bodies may be molded in mold 8 and multimolder 1 according to the invention. Where capsules or hollow bodies much longer than thick are being united according to the invention, a vibrator 97 attached to side of mold 61 (or 8) causes the capsules to fall into positions taking up a minimum space in cavity 63.

The process and apparatus described herein are applicable to molding cementitious mixtures where the binder is cold-setting and selected from the group consisting of lime, gypsum, magnesite, sorel cement, calcareous cement, Portland cement, high early strength cement, natural cement, high alumina cement, soluble silicate cement. The gases that may be utilized are limitless but those most available and most easily applied interiorly of the confined charge and in contact therewith are: air hot or cold and under plus or minus pressure, steam, mixtures of air and water, of steam and air, of steam and water, and products of combustion, as of fuels burned in chamber 72. In molding Portland cement concrete, one gas used may be carbon di-oxide which hastens the set of the concrete. Thermo-sensitive materials may be added to the cold-setting binders, materials such as polyvinyl alcohol, emulsified asphalt, latex natural or artificial, casein, sodium silicate, in which case a hot gas coming in contact with the outer surfaces of the confined mass being molded quickly firms the outer surfaces and the setting of the interior takes place wholly outside the mold. Again, the binder used may be selected from the thermo-binding group consisting of glue, rosin, sodium silicate, natural and synthetic latexes, rubber, vegetable and mineral pitches, oils, tars, gums, bitumen, asphalt, casein, thermo-plastic and thermo-setting synthetic resins. In the molding of thermo-plastic materials, the invention may apply a hot gas initially to soften, then a cooling gas to reharden the constituents being molded. Among the porous discrete materials of mineral origin used in the molding process herein are slag, expanded slag, exfoliated vermiculite, cinders, popped perlite, coke breeze, pumice, scoria, baked bloating clay, baked slate, baked shale. Among the fibrous materials used herein are the mineral fibers; asbestos, rock wool and glass fiber; among discrete materials of vegetable origin used herein are milled newspapers, wood wastes, wood wool, bagasse and plant fibers including those retaining and those separated from their natural lignin. Thus the invention finds wide practical use in many fields besides those particularly described herein: concretes, ceramics, plastics, powdered metallurgy, in forming foundry cores and in uniting massed hollow bodies for the formation of featherweight structures and rayshields and other products required by a space age.

The drawings, being illustrative only, are more or less diagrammatic in character to show the preferred relationship of the parts and the kinds of products which the apparatus and process are particularly suited to form. The invention concerns both the apparatus and the process based on its use, and various changes in the apparatus and methods described herein may be made without departing from the spirit and scope of the invention as set forth in the appended claims; and it will be understood that any of the variants and modifications in the apparatus, in the molding methods, and in the results obtained may be used separately and in any desired combination, and that all changes which come within the meaning and range of equivalency of the claims are therefore intended to be embraced therein.

Having thus broadly defined and fully described my invention, what I claim and desire to secure by Letters Patent of the United States is:

1. The product forming thermal apparatus which comprises a rigid casing housing both a molding cavity and a combustion chamber, the molding cavity having porous walls of which one or more are operative in the casing to enlarge the cavity and to open the same to receive and confine therein a charge made up of loosely discrete components of the product to be formed, and the combustion chamber being walled to have an inside resistant to intensely hot products of combustion, as from an oxyacetylene flame, and an outside comprising thermally insulative material, the combustion chamber housing a fuel-combustion nozzle pointed like a blowtorch at a heat-diffusing member spaced from but next to a fixed wall of the casing separating the chamber from the cavity and directly walling each thereof, and housing minute passages directly leading from said chamber to said cavity to convey hot products of combustion from said nozzle interiorly of, and in contact with the charge confined in said cavity; and said one or more operative walls being movable to constrict the cavity volume to compress and consolidate said heated components to unite the same and shape said charge against said walls.

2. The product-forming thermal process which comprises confining an amorphous mass of fusible particles in a closed mold cavity having gas-pervious rigid walls and an initial volume substantially exceeding that of said mass, said particles selected from the group consisting of solid, porous and hollow particles, applying a pressured flow of hot gas interiorly of the confined mass and in contact with said particles to toss the particles into a state of turbulence ensuring a switch transfer of fusible heat from said gas to each of the tossed particles, reducing said initial volume of the cavity to compact the particles and shape the mass, and releasing the formed product from the mold.

3. The product-forming process which comprises confining in the forming cavity of a closed mold having vapor-pervious walls a loose mass of substantially dry particles too fine to leave open fluid passages through said mass, opens up a new field of composite materials and ease of control in making them.

Sand cores for foundry moldings may also be formed by the process herein described. A charge principally of sand but containing a small percentage of clay is confined in cavity 63, subjected to turbulence and steam and compressed by pistons 65, 66 and 67 to desired form, whereupon a minimum of drying with a minimum of distortion is required to render the core quickly ready for use.

Metal products initially consisting of component metallic powders, flakes or scales, are also formed according to the invention. It will be noted that the pistons of FIG. 9 apply their pressure on the confined charge from two different directions. Another piston may be added so that the pressure is applied three-dimensionally: i.e., in the direction of the product's length, in the direction of its width and in the direction of its thickness. High temperature-resistant metals—such a metal as zirconium—and high-temperature resistant non-metals, and materials difficult to mold under the conditions of prior art, may be subjected to turbulence, high heat, an absence of oxygen in mold 61 and consolidated and shaped in cavity 63, then outside the mold subjected to the intense temperatures required to fully fuse the particles. Very complex molding conditions are kept within accurate control.

Porous products, such as filters and highly heat-resistant or insulative sponges of metals, metallic ores or the like, may be formed by confining charges of the metal, in the form of powder or flakes with a flusible binder in cavity 63, applying a hot gas interiorly of the confined and turbulent charge, pushing pistons 65, 66 and 67 inwardly to compress and form the charge and fuse the binder, then outside the mold, subjecting the formed product to intense heat to burn out the binder and fuse the particles in a sponge or filter-like structure.

FIG. 10 shows a product formed in cavity 63 (or in mold 8), the discrete material being molded in this instance not made up of solid or porous particles, or of foamaceous compounds, but of hollow bodies. The early years of space exploration have demonstrated the tyranny of gravitational attraction. Rocketry has been largely an endeavor to "rise above" and escape this force. Too much of mundane engineering, to say nothing of what lies ahead in the Space Age, depends on pre-space-age materials having great strength accompanied by almost maximal gravitational attraction. What is needed is a family of structural materials of much lighter weight. To this end, and so that we may eventually develop lighter, adequately strong, better materials from which to construct dwellings, house trailers, curtain walls, partitions, FIG. 10 shows a mass 85 made up of discrete hollow bodies 86, each a separate entity before being united according to the invention with contiguous hollow bodies 86 and each comprising a globular envelope 87, also called film, skin or shell, which has an interior 88 filled with a gas under pressure. Before confinement in cavity 63, each globular envelope 87 is distended bubble-like except for being thicker and more permanent instead of ephemeral. The formation of such hollow bodies 86 lies outside the scope of this invention and has been described in another place. Here a mass 85 of such hollow bodies 86 is confined in mold cavity 63 wherein filterplates 68' are corrugated instead of flat-faced as in FIG. 9; a flow of hot gas is passed between and around the globular bodies 86 by way of hollow spaces 89, and if shells 87 of contiguous hollow bodies 86 are of thermo-plastic material, the hot gas slightly softens the shells, a slight amount of pressure by the pistons 65, 66, 67 squeezes the shells 87 together where they cohere at their points of contact, whereupon refrigerated air is passed through spaces 89 to "freeze" mass 85 into permanent unity. Upon freeing the formed mass from the mold, corrugated filterplates 68' may be replaced with opposite facing sheets of permanent material, such as aluminum or impregnated fiber, and a feather-weight structural material of great stiffness results.

Before mass 85 is taken from mold cavity 63 and while hot gas is maintaining the plasticity of the shells 87, piston pressure can be increased to deform shells 87 from spherical to out-of-round and if this pressure is further increased by the pistons, spaces 89 become completely closed and the original mass 85 takes the form shown in FIG. 11, where each initially globular "bubble" 86 has been squeezed so much out-of-round as to become an angular polyhedron 86', the faces of contiguous polyhedral bodies 86' being in coherent contact with the result that each reinforces its neighbors three dimensionally to achieve extreme rigidity with a minimum of material, in fact the strongest structure per ounce ever conceived. By the process described, a product is formed having any outward shape and a minimum of gravitational attraction, qualities certain to be increasingly appreciated in a period that is beginning to be called "The Space Age."

FIG. 12 shows groups of united hollow bodies within larger hollow bodies. Cylinders 90, octagonal in cross section, enclose a united mass of hollow bodies 91 which, seen from the side as in FIG. 14, are capsular; and a number of cylinders 90 are laterally joined together between a pair of opposite facing sheets 92. In FIG. 13, facing sheets 92 form opposite sides of a structural member having two inner sheets 93 deformed from rolls of sheeting to form what in cross section are complete hexagons 94 between pairs of half-hexagons 95 which enclose hollow bodies 86 united in groups according to the invention. Such structures may be made to have either rectilinear longitudinal axes or curved, and in addition to combining substantial strength with minimal gravitational attraction, may be made highly resistant both to solar and to cosmic radiation. By making hollow bodies 91 much longer than thick and lapping contiguous hollow bodies 91, great lengthwise stiffness is secured. Where cylinders 90 and facing sheets 92 are of transparent material such as clear plastics and hollow bodies 91 are formed of the same material, the resultant panel becomes a translucent wall and for mundane structures may be formed of glass. Or the materials may be in part metallic and opaque.

The forming of hollow bodies is not exactly new in the art. Machines exist for forming capsules of gelatin for medicinal use. Other machines exist for filling capsules with fluids or solids. Large hollow balls of rubber and ping-pong balls of a celluloid-like plastic are articles of commerce, as are globular Christmas tree ornaments and light-bulbs of glass. Hollow bodies are easily formed of hollow tubing, whatever the material may be. Capsular hollow bodies are readily formed by drawing sheet metal in dies or by substituting any less soluble film-forming material, such as polymeric amides having a protein-like structure or a styrene resin for the gelatin. What the invention especially concerns is a process of uniting massed hollow bodies by use of a gas or combination of hot and cold gases and by application of mechanical pressure giving the group a particular internal structure as in FIG. 11. This means that the hollow body herein has no individual utility, such as the medicinal capsule, the ping-pong ball, but serves as a new kind of building block, like the molecule in Nature, to achieve an infinite variety of new structures and structural materials. Since the bubble assumes the greatest bulk with the least material, the ideal building block from the point of view of the process herein described is a permanently skinned bubble. Ephemeral bubbles, as of water, soap and glycerine, may be blown through layered mists of film-forming components capable of effecting hydrogen bonds with the ephemeral bubble constituents up to the point where the skins have lost their ephemeral character and taken on permanence, or the bubbles may be blown directly from hot thermoplastic film-forming material and cooled in their fall to a point where they possess thermo-hardened skins. But it is apparent that the process here described can unite said cavity having an initial volume substantially exceeding that of said mass, applying a pressure flow of nearly dry vapor interiorly of the confined mass and in contact therewith to turbulently separate the particles one from another and very slightly wet the separated particles to the extent of becoming adhesive under pressure, reducing the volume of the cavity to press the particles cohesively together and shape said mass against said walls, releasing the nearly dry product from the mold, subjecting the released product to less than fusing heat to thoroughly dry the product without harmful shrinkage, and subjecting the dried product to fusing heat to fuse the particles.

4. The dry method of forming a fusible product which comprises confining a powdery charge of amorphous ceramic constituents and fluxing material in a closed mold cavity having rigid walls of which some are gas-pervious, said cavity substantially exceeding the initial volume of said charge, applying a dry hot gas interiorly of the confined charge and in contact therewith to toss said constituents and fluxing material turbulently in said cavity to quicken transfer of the heat of said gas to said fluxing material to make the same cementitious, reducing the volume of the cavity to compact and form said charge, and transferring the formed product directly from said cavity to a kiln having an interior temperature exceeding the fusion point of said ceramic constituents to permanently fuse the same in said kiln.

5. A sand core forming method which comprises confining a charge of particles made up in major part of sand and in minor part of clay in the molding cavity of a closed mold having rigid walls, some being gas pervious and said cavity having an initial volume substantially exceeding that of said charge, passing a flow of aqueous gas into, through and from the cavity and in contact with said charge to toss the sand and clay particles turbulently together and make the clay particles very slightly adhesive, reducing the volume of the cavity to press, compact and shape the charge and bond said sand with said clay, and subjecting the formed sand core to heat to bone-dry the same.

6. The metal product forming process which comprises confining in the cavity of a closed mold having gas-pervious walls a loose mass of particles of which a proportion is metallic, the cavity having a volume substantially exceeding the volume of said loose mass, blowing a gas through and from said cavity and in contact with said particles to toss the same into a state of turbulence, drawing a flow of intensely hot gas through and from the cavity and in contact with the turbulent particles, maintaining said flow to make some of the particles fusible, reducing the volume of the cavity to compact the particles and shape the mass, and releasing the metallic product from the mold.

7. The thermal process of forming a solid product, which comprises confining an uncompacted porous mass of thermo-bindable discrete material with a closed mold having smooth-faced, rigid, fluid-pervious walls, treating fluent matter outside the mold to substantial changes of temperature and pressure, conveying the treated fluent matter comprising hot fluid to a conduit of rigid cross section in the mold, from the conduit applying a forceful spread of the conveyed fluent matter in divers directions interiorly of the confined mass and in contact with said material, utilizing the pressure of said spread and the heat of said fluid to thermally consolidate said material and shape said mass against said walls, and removing the solid product from the mold.

8. The thermal process of forming a hollow product, which comprises confining a mass of thermo-cementitious material with the walls of a closed mold, treating fluent matter outside the mold to changes of temperature and pressure, conveying the fluent matter comprising hot fluid to a core-forming retractive conduit of rigid cross section extending into the confined mass, releasing the conveyed fluent matter from deeply inside said mass and in contact with said material, directing a forceful spread of the released fluent matter away from said conduit and toward and through the filtering walls, and utilizing the pressure of said spread and the heat of said fluid to thermally consolidate said material and shape said mass against said walls while freeing said core-forming conduit for easy retraction from the hollow formed by said conduit in said product.

9. The thermal process of forming a reinforced product, which comprises entering a group of slender metallic reinforcement elements into a mold to be in spaced relation with the filtering mold walls surrounding said group, confining the spaced elements with an encasing uncompacted mass of aggregate and cementitious material including a heat-sensitive additive in the mold, treating fluent matter outside the mold to changes of temperature and pressure, conveying the treated fluent matter into and releasing the same inside the confined mass and in contact with said material, directing a pressured spread of released fluent matter including hot fluent matter between said elements and through said walls, and utilizing the pressure and temperature of said spread to consolidate said material and additive about said elements and shape said mass against said walls, and releasing the reinforced product from the mold.

10. The thermal process of forming a product, which comprises surrounding an uncompacted porous mass of thermally agglutinative discrete material with the porous walls of a closed mold, treating different kinds of fluent matter outside the mold to changes of temperature and pressure: said kinds being selected from the fluid group consisting of gaseous matter, liquid matter, solid matter in solution and solid matter in dispersion: conveying the treated different kinds of fluent matter to a group of conduits of fixed cross section within the mold, releasing from the conduits from deep inside the confined mass influxes of the conveyed fluent matter, directing a forceful spread of released fluent matter through said material and in contact therewith and through said walls to thermally consolidate and agglutinate said material and shape said mass against said walls while freeing said conduits for easy withdrawal from the mold.

11. The thermal process of forming a prestressed product, which comprises entering a reinforcement unit of spaced prestressed metallic elements into a mold to be in spaced relation with the filtering mold walls surrounding said unit, confining the reinforcement unit and an uncompacted heat-sensitive encasing mass of cementitious material on all sides with said mold, subjecting fluent matter outside the mold to changes of pressure and temperature, conveying the modified fluent matter including hot fluent matter to a conduit of rigid cross section extending operatively through a portion of one side of the mold, thrusting said conduit between said elements and into the heat-sensitive confined mass while releasing the conveyed fluent matter in jets from the advancing end and sides of said conduit and into contact with the confined material, continuing to decrease the volume of, and thereby mechanically compact the confined mass by further advancing the conduit inside said mass while continuing to direct the spread of released fluent matter outwardly through said material and said walls, utilizing the pressure and temperature of said spread to consolidate the material about said elements and shape the compacted mass against said walls, withdrawing the conduit from the mold and releasing the prestressed product from the mold.

12. The thermal process of forming a lightweight cementitious product which comprises confining an uncompacted mass of porous discrete material with a closed mold having fluid-pervious walls, treating fluent matter outside the mold to changes of temperature and pressure, said fluent matter comprising a liquid solution of a chemical salt, conveying the treated fluent matter to a conduit of rigid cross section in the mold, applying the fluent matter hot interiorly of the confined material and in contact therewith to effect a chemical union with the confined material, and utilizing the temperature and pressure of the applied fluent matter to consolidate said material and shape said mass against said walls.

13. The thermal process of molding a product, which comprises placing a slurry of liquid and bits of fibrous material within the constraint of filtering walls, subjecting fluent matter outside said walls to heat and pressure, applying jets of the hot fluent matter interiorly of the slurry and in contact with said fibrous bits to displace liquid from said slurry through said walls, and applying a succession of hot high-pressure jolts of said fluent matter against the matted material to thermally agglutinate and shape the same against said walls.

14. The thermal process of simultaneously forming a pair of like products which comprises surrounding a heat-sensitive uncompacted mass of discrete moldable material with the filtering walls of a closed mold, reducing the interior volume of the confined mass by advancing into the midst of the mass a conduit having a rigid exterior extending through a portion of one mold wall, treating fluent matter outside the mold to changes of pressure and temperature, conveying the treated fluent matter through said conduit in to the mold, releasing the conveyed fluent matter inside said mass and in contact with said material while the advance of said conduit is dividing the mass into twin portions, and utilizing the in-and-out movement of said conduit and the pressured spread of said fluent matter through said material and walls together with the changed temperature of said spread to consolidate and shape the twin products against said walls.

15. The thermal process of smooth-facing a porous mass which comprises confining the mass directly against the smooth, polished, gas-pervious surface of a rigid wall, conveying fluent matter comprising steam and fluent solid matter through a conduit to the confined mass, from the conduit directing a pressured flow of said fluent matter through said porous mass and in contact therewith to thermally consolidate and shape said fluent solid matter against said surface while said steam is passing through said wall.

16. The product-forming process which comprises confining an uncompacted cementitious mass of discrete and fluid materials in the molding cavity of a closed mold having filtering walls, substantially reducing the volume of said cavity by ramming a rigid conduit into the confined mass to expel some of said fluid through said walls, from the conduit releasing a flow of gaseous matter from inside the confined mass and in contact therewith, and applying the pressure of said flow outwardly toward and through said walls to consolidate said material and shape said mass against said walls.

17. The fusion process of forming a product, which comprises confining an amorphous mass of discrete fusible material in a closed mold having gas-pervious porous walls, releasing from deep inside the confined mass a flow of gas comprising steam to be in direct contact with said confined material, pressuring said flow through the confined material in passage toward and through said walls to consolidate and fuse the material and shape the mass against said walls.

18. The process of gassing a product during the formation thereof which comprises confining on all sides with the walls of a filtering mold cavity a mass of loosely discrete components of the product including concrete aggregate material and plastic lime-silica cement, and applying interiorly of the confined mass and in contact therewith a pressured flow of gaseous carbonic matter selected from the carbonic group consisting of carbonic gas, carbonic products of combustion, a carbonic oxide mixed with steam, carbonic matter mixed with air and carbonic matter mixed with both steam and air, and maintaining said flow at a temperature below 200 degrees F. through the loosely discrete components to start the lime-silica reaction of said components and to start the chemical combination of said lime with the carbonic matter to form calcium carbonate, and utilizing the pressure of said flow together with a reduction of the cavity volume to press, consolidate and shape said confined components against said walls.

19. The product-forming thermal process which comprises confining within the walls of a filtering mold cavity a mass of loosely discrete components of the product consisting of hollow bodies, each having only a single central void wholly enveloped by a curvaceous hole-free thermo-cementitious exterior distended by a gaseous interior under greater than atmospheric pressure, and forcing a flow of gaseous fluent matter from outside the cavity interiorly of, and in contact with, the confined mass and, during said flow, constricting the cavity volume to deform said curvaceous exteriors to be substantially polyhedral and to bring side and end facial areas of the deformed exteriors into increased mutual contact, and increasing the temperature and pressure of said gaseous fluent matter in the cavity and the constriction in volume of said cavity to press and bind the hollow bodies together and shape said mass against said walls.

References Cited in the file of this patent

UNITED STATES PATENTS

| | | |
|---|---|---|
| 730,778 | Kunick | June 9, 1903 |
| 762,054 | Hendricksen | June 7, 1904 |
| 1,213,982 | Von Hassel | Jan. 30, 1917 |
| 1,335,222 | Davis | Mar. 30, 1920 |
| 1,421,748 | Willard | July 4, 1922 |
| 1,556,193 | Anderson | Oct. 6, 1925 |
| 1,831,982 | Wagner | Nov. 17, 1931 |
| 1,940,975 | Shaver | Dec. 26, 1933 |
| 2,072,694 | Walter | Mar. 2, 1937 |
| 2,133,675 | Njzn | Oct. 18, 1938 |
| 2,187,432 | Powers | Jan. 16, 1940 |
| 2,267,508 | Spengler | Dec. 23, 1941 |
| 2,297,248 | Rudolph | Sept. 29, 1942 |
| 2,311,358 | Morton et al. | Feb. 16, 1943 |
| 2,321,756 | Kyle | June 15, 1943 |
| 2,367,648 | Nichols | Jan. 16, 1945 |
| 2,369,006 | Banks | Feb. 6, 1945 |
| 2,509,652 | Rushmer et al. | May 30, 1950 |
| 2,528,643 | Dubbs | Nov. 7, 1950 |
| 2,638,655 | Creskoff | May 19, 1953 |
| 2,787,809 | Stastny | Apr. 9, 1957 |
| 2,794,233 | Baily | June 4, 1957 |
| 2,806,509 | Bozzacco et al. | Sept. 17, 1957 |
| 2,865,800 | Stastny | Dec. 23, 1958 |
| 2,907,072 | Jodell | Oct. 6, 1959 |
| 3,002,248 | Willson | Oct. 3, 1961 |

FOREIGN PATENTS

| | | |
|---|---|---|
| 561,998 | Great Britain | June 14, 1944 |